(12) United States Patent
Busch

(10) Patent No.: US 7,331,901 B2
(45) Date of Patent: Feb. 19, 2008

(54) DRIVE ARRANGEMENT FOR AN AGRICULTURAL WORKING MACHINE

(75) Inventor: Jochen Busch, Dimbach (DE)

(73) Assignee: Deere & Company, Moline, IL (US)

( * ) Notice: Subject to any disclaimer, the term of this patent is extended or adjusted under 35 U.S.C. 154(b) by 237 days.

(21) Appl. No.: 11/294,776

(22) Filed: Dec. 6, 2005

(65) Prior Publication Data

US 2006/0128524 A1    Jun. 15, 2006

(30) Foreign Application Priority Data

Dec. 9, 2004    (DE)    ............ 10 2004 059 307

(51) Int. Cl.
*B60W 10/04*    (2006.01)
(52) U.S. Cl. .................................... 477/110
(58) Field of Classification Search ............... 477/111, 477/36, 110
See application file for complete search history.

(56) References Cited

U.S. PATENT DOCUMENTS 6,553,302 B2 *    4/2003    Goodnight et al. ........... 701/54

FOREIGN PATENT DOCUMENTS

| DE | 101 45 643 | 9/2001 |
| EP | 0 819 562  | 7/1997 |
| EP | 1 205 338  | 10/2001 |

* cited by examiner

*Primary Examiner*—Dirk Wright

(57) ABSTRACT

A drive arrangement for an agricultural machine with an internal combustion engine used to drive removable agricultural implements. The engine is connected to a control unit and to a power take-off (PTO), which drives the removable agricultural implements, by means of a power take-off transmission with selectable transmission steps. The engine is further coupled to a sensor that captures the RPM of the PTO outlet, to a first operator input device that influences the RPM of the combustion engine and to a second operator input device that inputs a maximum RPM of the PTO output. The control unit controls the RPM of the combustion engine to the input value of the first operator input device while limiting the RPM of the engine based on the RPM at the PTO outlet, which cannot exceed the input value of the second operator input device.

8 Claims, 2 Drawing Sheets

DRIVE ARRANGEMENT FOR AN AGRICULTURAL WORKING MACHINE

BACKGROUND OF THE INVENTION

1. Field of the Invention

The present invention generally relates agricultural machinery having an internal combustion engine. More specifically, the invention relates to agricultural tractors and a system for controlling the RPM of a power take-off used to drive removable agricultural implements, such as soil or bale presses.

2. Description of Related Art

Existing state of the art agricultural tractors are equipped with an internal combustion engine which provides locomotion through the tractor wheels, and it drives external accessories such as bale presses through a power take-off (PTO) on the tractor. A PTO transmission, with several operator selectable steps, connects the engine to the PTO and is used to regulate the RPM of the PTO at a given engine RPM.

The external accessories connected to the PTO are usually designed to be operated at a specific RPM. Therefore, in order to ensure proper operation of the external accessories and to prevent damage due to excessively high RPMs, it is useful to provide an automatic limit to the RPM of the PTO. Consequently, since the RPM of the PTO is directly proportional to the RPM of the tractor engine, this also necessitates limiting engine RPM.

In tractors currently produced by the applicant, engine RPM is adjusted using a pedal or a throttle hand lever. In addition, a limiting potentiometer is provided which permits the operator to set a maximum engine RPM. To set the limiting potentiometer, the operator accelerates the engine until a tachometer indicates the desired RPM and then manually sets the potentiometer. Thereafter, if the engine RPM reaches the limit set on the potentiometer an engine speed control intervenes and prevents the engine from exceeding that limit, regardless of the operator input.

However, this configuration means that the potentiometer limit is based solely on the RPM of the engine and not the PTO RPM. Thus, should conditions require the operator to select a different PTO transmission step, a new set-up of the limiting potentiometer is required. This is a significant disadvantage for existing tractors since the above procedure for adjusting the potentiometer is cumbersome and requires the operator to manually set the appropriate engine RPM, with the engine running, in each case. A further disadvantage is that it is not desirable to limit engine RPM while driving on a road or in the turn-around areas at the ends of fields.

In U.S. Pat. No. 6,607,466 a tractor is described where the nominal RPM of the PTO is preset by a lever calibrated to the desired PTO speed ranges. A controller then regulates the Tractor engine RPM in order to achieve the RPM desired at the PTO. However, unlike the present invention, this is done without a multi-gear transmission between the engine and the PTO. Furthermore, it is not possible for the operator to set the RPM of the engine separately from the PTO.

In U.S. Pat. No. 6,942,595, it is proposed to measure the RPM of the PTO at the outlet of a variable transmission and to use it for regulating the RPM of the engine. In this case an expensive variable transmission is used and again the operator does not have the ability to preset the RPM of the engine.

In view of the above, it is apparent that there exists a need to improve agricultural tractors with a PTO driving external accessories. The objective of this invention is therefore to allow an operator to set both the engine RPM and a maximum PTO RPM without the need to reset the limits whenever a different PTO transmission gear is selected.

BRIEF SUMMARY OF THE INVENTION

In satisfying the above need, as well as overcoming the enumerated drawbacks and other limitations of the related art, the present invention discloses a drive arrangement of an agricultural tractor with an internal combustion engine connected to a power take-off (PTO) by means of a multi-step transmission. A control unit is associated with the combustion engine and a sensor for capturing the RPM of the PTO. A first operator input device (e.g. a gas pedal and/or a throttle hand lever) connected to the control unit allows the operator to set the desired RPM of the combustion engine. A second operator input device is also connected to the control unit and allows the operator input a maximum RPM of the PTO. The control is then capable of regulating the RPM of the combustion engine based on the value set with the first operator input device and limited by the maximum value set with the second operator input device as read at the PTO RPM sensor.

More specifically, the control device first controls the RPM of the combustion engine to the value entered with the first operator input device. In addition, it compares the actual RPM of the PTO, as measured by the PTO RPM sensor, to the desired maximum PTO RPM, as entered with the second operator input device, and reduces the RPM of the combustion engine if the actual RPM at the PTO exceeds the preset maximum RPM value. In this way, the present invention provides a user-friendly drive arrangement that allows an operator to easily enter and change a desired maximum RPM for the PTO.

The second operator input device may have a gauge and/or an indicator associated with it to represent the selected maximum RPM of the PTO.

The sensor may either capture the RPM at the PTO directly or it may measure the RPM of the combustion engine and the control device, based on the selected gear-ratio of the PTO transmission, may calculate the RPM of the PTO.

A preferred embodiment of the invention also includes a third operator input device for the purpose of entering a maximum combustion engine RPM and/or a maximum propulsion speed for the machine. In this embodiment, in addition to limiting the maximum PTO RPM, the control unit further limits the combustion engine RPM such that neither the maximum engine RPM and/or maximum propulsion speed will be exceeded.

It is possible to design the PTO so it can be switched off, by means of a clutch for example, and to deactivate the effect of the second operator input device. Deactivation of the PTO can be recognized by means of the sensor capturing its RPM and/or a PTO shaft switch for turning the PTO on/off. When the RPM of the PTO is captured by a sensor, this distinction is unnecessary since the preset maximum RPM cannot be reached when the PTO is switched off, so that there is no stepping down of the combustion engine. This capability is particularly necessary since it is not desirable to limit engine RPM while driving on a road or in the turn-around areas at the ends of fields.

In spite of the second operator input device of the present invention, operator errors are still possible if a significantly higher maximum RPM of the PTO shaft is inadvertently entered. In order to avoid damage to the external accessory in such cases, the control device may further limit the engine RPM such that an established absolute maximum PTO RPM is not exceeded. The absolute maximum PTO RPM is defined based on the selected step of the PTO transmission and the associated nominal RPM of the combustion engine. The limit value is typically a certain percentage (e.g. 40%) above the nominal engine RPM.

The above and other aspects and advantages of the present invention will become apparent upon reading the following detailed description of the invention in combination with the accompanying drawings.

DETAILED DESCRIPTION OF THE INVENTION

Figure 1:
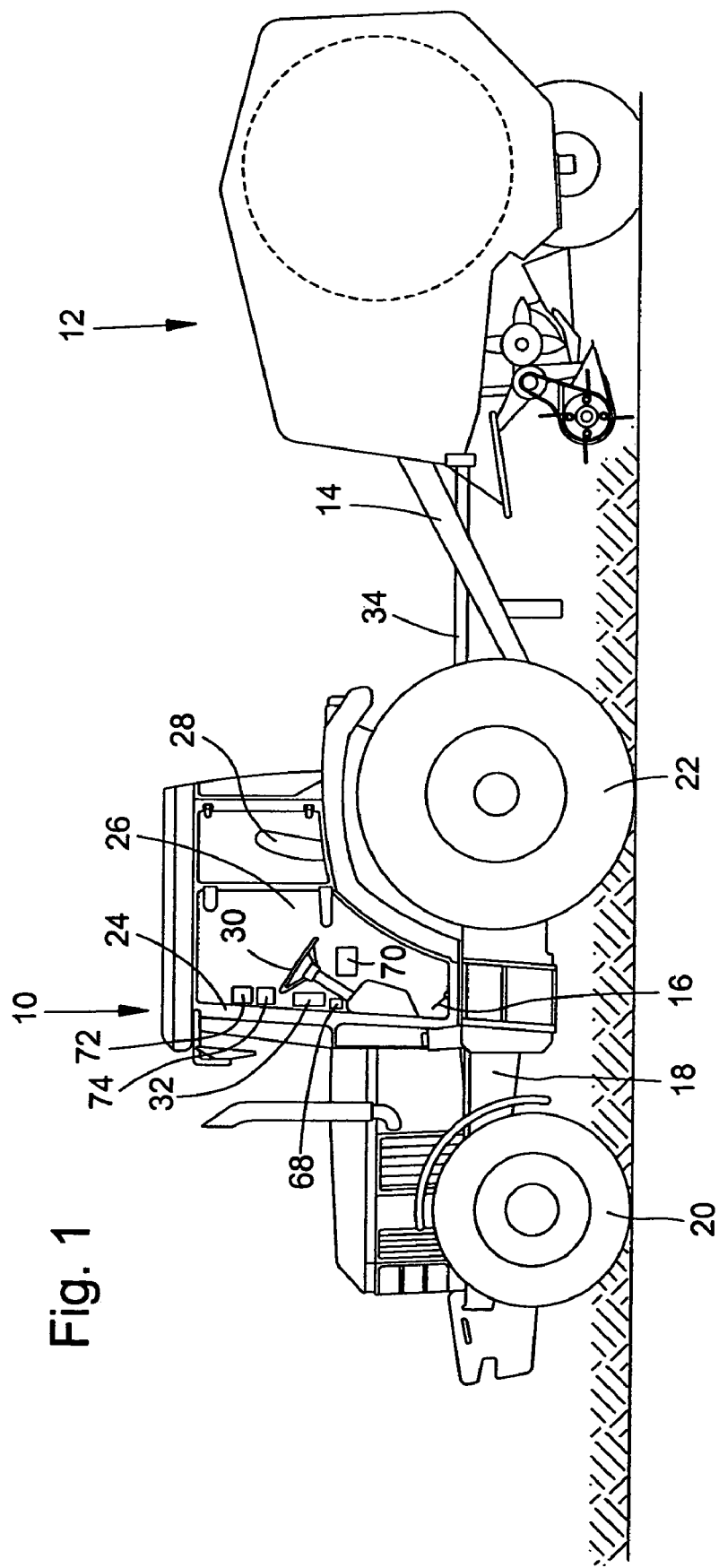
FIG. 1 illustrates a side view of an agricultural machine (in the form of a tractor) with a trailed implement (in the form of a round baler) in accordance with the present invention.

FIG. 1 shows a side view of an agricultural machine 10, in the form of a tractor, and a working implement 12, in the form of a round baler, coupled over a hitch 14 to a coupling (not shown) of the machine 10. The machine 10 is constructed on a frame 18 that is supported by steerable front wheels 20 and driveable rear wheels 22 and carries a cabin 24 in which an operator work station 26 is located.

The operator work station includes a seat 28, a steering wheel 30, a gas pedal 16 and other pedals for brake and clutch (not shown) and several input elements—located within arm's length of the operator placed at the operator work station 26—for setting selectable functions of the machine 10. The latter includes a transmission step selection device 32 for the transmission step of a PTO gear 46, a throttle hand lever 70 (see FIG. 2), a PTO shaft switch 68, a (second) operator input device 72 for setting a maximum RPM of a PTO output 56 and a (third) operator input device 74 for setting a maximum RPM of the combustion engine 36. The operator input devices 72, 74, the transmission step selection device 32, and/or the PTO shaft switch 68 could also be implemented as menu items on a virtual terminal of a bus system operating in accordance with ISO 11783. The gas pedal 16 is equipped with a sensor which transmits electrical signals containing information about the position of the gas pedal 16 to the operator interface logic 64. The gas pedal 16 and the throttle hand lever 70 are designated hereafter as the first operator input device. Instead of, or in addition to these elements, a driving lever could also be used as first operator input device.

Figure 2:
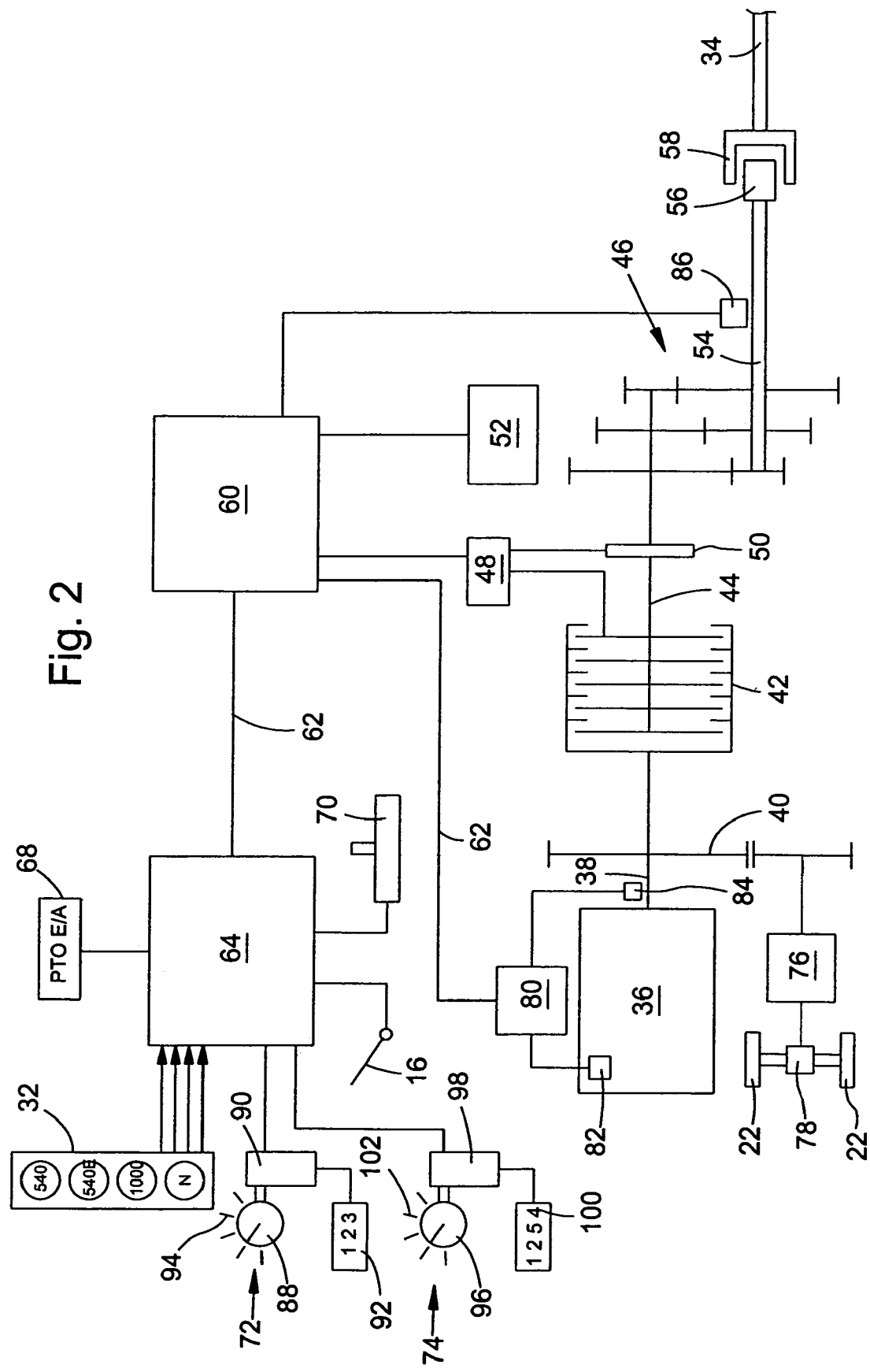
FIG. 2 a schematic diagram of a drive arrangement of the machine seen in FIG. 1 and embodying the principles of the present invention.

FIG. 2 shows a schematic diagram of the drive arrangement of the working machine 10 for driving the rear wheels 22 and a PTO shaft 34 which drives the implement 12. A combustion engine 36, usually a diesel engine, drives a shaft 38 which, through a gearwheel 40, provides power to the rear wheels 22 and, in a preferred embodiment, also powers the front wheels 20 and, if applicable, other devices of the working machine 10, such as air conditioner or a generator. The rear wheels 22 and, if applicable, the front wheels 20 are driven through a known mechanical transmission 76 with a selectable and in the individual transmission steps constant ratio and a differential gear 78. The propulsion speed of the working machine 10 is therefore proportional to the RPM of the combustion engine.

The shaft 38 is also coupled to a hydraulically operated coupling 42 which on its output side is connected to an input shaft 44 of a PTO gear 46. The coupling 42 is activated through a valve assembly 48 which is also connected to a brake 50 mounted on the input shaft 44.

The PTO gear 46 features three different, selectable transmission steps and hence comprises three pairs of gear wheels. The gear wheels are hard-mounted to the input shaft 44 and rotably-mounted, for example by means of displaceable coupling elements (see U.S. Pat. No. 5,910,067), to the driven shaft 54, or vice versa. The transmission step is selected by an electro-hydraulically, or electrically powered actuator 52 which engages the desired gearwheel into contact with the driven shaft 54 thereby transferring torque from the input shaft 44, through the gearwheels, and into the driven shaft 54. Alternatively, if the gear wheels are hard mounted to the driven shaft 54, the actuator 52 may determine which of the rotably-mounted wheels on the input shaft 44 are engaged into contact with the input shaft 44, thereby transferring torque from the input shaft 44, through the gearwheels, and into the driven shaft 54.

The actuator 52 permits the selection of three transmission steps in the present embodiment. For example, the first step may cause the driven shaft 54 to rotate at 1000 RPM with a 2100 RPM nominal speed of the combustion engine 36, the second step may cause the driven shaft 54 to rotate at 540 RPM resulting in a reduced 1800 RPM nominal engine speed, and the third step may also result in 540 RPM for the driven shaft but the nominal engine speed increases back to 2100 RPM. It is important to note that these values are just representative for each step, and alternate embodiments may use different values or even a different number of steps. In addition, the actuator may also select a neutral position, where none of the rotably-mounted gearwheels of the PTO gear 46 are engaged with either the input shaft 44 or the driven shaft 54, allowing the driven shaft 54 to freely rotate even when the brake 50 is activated.

The driven shaft 54 is connected with a PTO output 56 in the form of a shaft butt end onto which it is possible to slide the PTO shaft 34 of the implement 12, which features a sleeve (or hollow) shaft end piece 58. This coupling or the PTO shaft usually incorporates a universal-joint.

An electronic control unit 60 is connected to the valve assembly 48 and the actuator 52. By means of a device bus 62 (e.g. CAN-bus) it is also connected with an operator interface logic 64 which in turn is connected to the transmission step selector 32, the first operator input device (gas pedal 16 and throttle hand lever 70), the second operator input device 72, the third operator input device 74, and the PTO shaft switch 68. The transmission step selector 32 comprises four push buttons with each one of these being associated with one of the mentioned transmission steps and the neutral position.

The transmission step selection device 32 allows the operator to select, by manually activating one of the four push buttons, any of the three transmission steps or the neutral position of the PTO gear 46. The operator interface logic 64 transmits information relating to the operator inputs via the bus 62 to the control unit 60 which then activates the actuator 52 in accordance with the information received. The selected transmission step may be indicated to the operator by illumination of the associated pushbutton of the transmission step selection device 32.

When the operator switches the PTO shaft switch 68 into the operating position, the operator interface logic 64 transmits appropriate information via the bus 62 to the control unit 60 which in turn triggers the valve assembly 48 to release the brake 50 and to engage the coupling 42. When the operator switches the PTO shaft switch 68 into the non-operating position, the operator interface logic 64 transmits in analog fashion appropriate information via the bus 62 to the control unit 60 which in turn triggers the coupling 42 to open and to activate the brake 50.

Via the bus 62 the control unit 60 is furthermore connected to a motor control 80 which in turn controls an injection device 82 of the combustion engine 36 and said injection device is provided with information from an engine sensor 84 regarding the RPM of the shaft 38. A PTO sensor 86 which is connected to the control unit 60 captures the appropriate RPM of the driven shaft 54 whose RPM is identical to that of the PTO outlet 56. The engine sensor 84 and the PTO sensor 86 may work together with the associated shafts 38 and 54 respectively, either optically (through perforated encoder discs connected to the shaft 38, 54 and which work together with photoelectric barriers) or magnetically (through magnets connected to the shaft 38, 54 and which work together with induction coils, reed relays or Hall sensors), or they may capture the RPM in any other fashion.

The second operator input device 72 comprises an input potentiometer 88 which is connected to an interface 90 which in turn is coupled to the operator interface logic 64 and an indicator 92. The input potentiometer 88 is provided with a scale (gauge) 94 which affords an approximate orientation about the selected maximum RPM of the PTO outlet 56, while the indicator 92 shows this RPM digitally. Instead of the input potentiometer 88 it would also be possible to provide either an optical encoder device equipped with a rotary type button or a bank of keys.

The third operator input device 74 comprises an input potentiometer 96 which is connected to an interface 98 which in turn is coupled to the operator interface logic 64 and an indicator device 100. The input potentiometer 96 is provided with a scale (gauge) 102 which provides an approximate orientation about the selected maximum RPM of the combustion engine 36, while the indicator 100 shows this RPM digitally. Instead of the input potentiometer 96 it would also be possible to provide either an optical encoder device equipped with a rotary type button or a bank of keys or a menu item on a virtual terminal of a bus system operating in accordance with ISO 11783. Instead of indicating RPMs the gauge and/or indicator device 100 could also show velocity units; in that case it would be necessary to provide a gauge for each transmission step of the transmission 76.

During operation the operator sets a desired RPM of the combustion engine using the first operator input device, i.e. the gas pedal 16 or the throttle hand lever 70. The applicable information is transmitted by the operator interface logic 64 and the control unit 60 to the motor control 80 which drives the injection device 82, so that a desired propulsion speed of the working machine 10 will be obtained. The motor control 80 receives feedback information from the RPM sensor 84, so that it can regulate the RPM of the combustion engine 36.

The control device 60 receives from the PTO sensor 86 information about the RPM of the driven shaft 54 and compares the measured RPM against the maximum value entered through the second operator input device 72. If this maximum value is exceeded, the control device 60 commands the motor control 80 to reduce the RPM of the combustion engine 36. In this manner the RPM of the PTO output 56 is limited to a value which is simple to enter. Further, to avoid damage to the implement 12, in case an erroneous value is input into the second operator input device 72, the control unit 60 has a permanent routine that will also reduce the RPM of the combustion engine 36 if the RPM of the PTO outlet 56 exceeds its rated RPM by, for example, 40%.

In addition, the control device 60 also asks the motor control 80 for the current RPM of the combustion engine 36 which is measured by the engine sensor 84. The control device compares the measured RPM, or the calculated speed of the rear wheels, against the maximum value entered through the third operator input device 74. If this value is exceeded, the control device 60 commands the motor control 80 to reduce the RPM of the combustion engine 36.

In an alternate embodiment, it is possible to omit the PTO sensor 86. This is done by having the control unit 60 calculate RPM of the PTO output 56 based on the engine RPM, registered by the engine sensor 84, and on the selected transmission step of the PTO gear 46, registered by the transmission step selection device 32. The calculated PTO outlet RPM is then compared with the maximum RPM entered through the second operator input device 72.

However, this embodiment only allows the maximum RPM of the PTO outlet 56 to be limited only when the coupling 42 is engaged. Information about the status of the coupling 42 is available to the control device 60, which controls the valve assembly 48, based on the input from the PTO shaft switch 68. If the PTO sensor 86 is not omitted, this embodiment may also serve as a back-up solution in the event of a failure of the sensor 86. Alternately, the rotational status of the PTO output 56 can be captured the PTO sensor 86, In this case, the PTO sensor 86 can be a simpler, cheaper version that only needs to register whether the driven shaft 54 is turning.

It should be noted that the functions of the operator interface logic 64, the control unit 60 and the motor control 80 could be implemented in a single electronic component or any other fashion. Also, the potentiometer 88 of the first operator input device 72 could be designed as a two-step model so that the first step serves to set the maximum RPM of the PTO output 56, while the second step sets the ceiling speed of the combustion engine 36. For example, to switch between the two areas one could respectively pull out, or push in the axis of the potentiometer knob.

The foregoing disclosure is the best mode devised by the inventor for practicing this invention. It is apparent, however, that methods incorporating modifications and variations will be obvious to one skilled in the art of agricultural machinery. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A drive arrangement of an agricultural machine comprising a combustion engine connected to both a control unit configured with a default value of engine RPM, and a power take-off (PTO) transmission having selectable transmission steps which is further connected to a power take-off having a PTO output that is associated with a sensor for determining the RPM of the PTO output, where the control unit is coupled with a first operator input device to influence the RPM of the combustion engine and a second operator input device that is adjustable to set a maximum RPM of the PTO output, the control unit being configured to regulate the RPM of the combustion engine during operation based on the input of the first operator input device and to limit the RPM of the combustion engine based on the input of the second operator input device, the limit of the RPM of the combustion engine being limited to the maximum RPM value entered on the second operator input device based on a measured value of the sensor.

2. The drive arrangement according to claim 1, further comprising an indicator device coupled with the second operator input device and which displays the selected maximum RPM of the PTO output.

3. The drive arrangement according to claim 1, wherein the sensor measures the RPM of the combustion engine and the control unit is configured to calculate the RPM of the PTO output based on the measurement of the sensor and a known PTO transmission ratio.

4. The drive arrangement according to claim 1, further comprising a third operator input device connected to the control unit, the third operator input device inputting at least one of a maximum RPM of the combustion engine and a maximum propulsion speed of the machine, the control unit being configured to limit the RPM of the combustion engine so that neither the maximum RPM of the PTO output nor the maximum RPM of the combustion engine or the maximum propulsion speed of the machine is exceeded.

5. The drive arrangement according to claim 1, wherein the PTO output can be switched on and off and the control unit is configured to deactivate the maximum RPM of the combustion engine entered via the second operator input device when the PTO output is switched off.

6. The drive arrangement according to claim 5, further comprising a PTO shaft switch configured to switch the PTO output on and off, the control unit being configured to recognize a deactivated PTO output based either on the PTO shaft switch or on the sensor.

7. The drive arrangement according to claim 1, further comprising the PTO transmission having a plurality of of transmission steps, the control unit being configured to limit the RPM of the combustion engine to prevent the RPM of the PTO output from exceeding a pre-determined percentage above an allowed RPM of the PTO output associated with each respective transmission step of the PTO transmission.

8. The drive arrangement according to claim 1 incorporated into a tractor.

* * * * *